United States Patent Office 3,277,023
Patented Oct. 4, 1966

3,277,023
METHOD FOR MAKING EXCHANGE RESINS FROM ANILINIUM EXCHANGE RESINS
Melvin J. Hatch, Midland, Mich., assignor to The Dow Chemical Company, Midland, Mich., a corporation of Delaware
No Drawing. Filed Sept. 13, 1962, Ser. No. 223,515
9 Claims. (Cl. 260—2.1)

This invention concerns the use as intermediates of polymeric vinylbenzyl dialkylanilinium anion exchange resins, for making other exchange resins.

Vinylaryl polymers containing halomethyl groups, such as vinylbenzyl chloride or bromide polymers and copolymers, and chloromethylated or bromomethylated polymeric styrene, including crosslinked chloromethylated or bromomethylated styrene copolymers, are not easily reacted with ionic nucleophilic reagents which latter are soluble in water, polar hydroxylated solvents or aqueous solutions thereof, such as the species

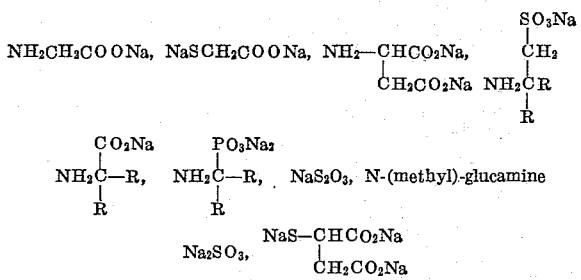

and the like, wherein R is hydrogen, an alkyl group, an aryl group, a substituted alkyl or a substituted aryl group, to establish a covalent bond with such species and the benzylic carbon atoms of the resin to give a resinous polymer having exchanging moieties or groups containing one or more exchanging moieties. This difficulty is due mostly to the hydrophobic nature of the polymer matrix to which halomethyl groups are attached.

Mutual solvents which will swell the polymer matrix and also dissolve such reagents are often not practical because of inefficiency in promoting the reaction. The same is often true with analogous reagents which can be converted to have exchanging moieties by a simple hydrolysis or oxidation reaction involving their substituent moieties.

It has now been discovered that halomethylated vinylaryl polymers can be reacted with N-dialkylanilines to give polymeric vinylbenzyl dialkylanilinium halide resins which resins react readily with ionic nucleophilic reagents having ion or chelate exchanging groups or precursor groups thereof to give exchanging resins of the ion exchanging and chelate exchanging types.

As compared with polymeric vinylbenzyl dialkylsulfonium halide resins, which also react readily with ionic nucleophiles to give other exchange resins, the anilinium resins provide a desirable alternative route for making other exchange resins which in many cases give better yields at no premium in cost as compared with the cost of the vinylbenzyl dialkylsulfonium halide resin route.

The halomethylated vinylaryl resin polymers which are reacted with dialkylanilines are halomethylated resinous polymers of styrene, vinyltoluene, vinylxylene, chlorostyrene, dichlorostyrene and the like containing an average of between about 0.25 and 1.5 ar-halomethyl groups per aromatic nucleus, which are crosslinked, advantageously to the extent of between about 0.2 and 8 mole percent, with a conventional crosslinking agent, e.g., a dialkenyl crosslinking agent such as divinylbenzene (DVB), divinyltoluene, divinylxylene, trivinylbenzene, diallyl esters, ethylene glycol diacrylate or dimethylacrylate, methylenebisacrylamide, etc. Alternatively, the corresponding polymers of vinylbenzylic halides can be used.

The intermediate anilinium resins are prepared by reacting the above-mentioned halomethyl resins with an N-dialkylaniline, an N-di(hydroxyalkyl)aniline or an N-alkyl-N-hydroxylalkylaniline wherein the alkyl and hydroxyalkyl groups contain a total of 6 carbon atoms, and wherein one alkyl or hydroxyalkyl group contains no more than 2 carbon atoms, and wherein the aryl nucleus is substituted by up to two 1 to 4 carbon alkyl groups and/or by up to two halo groups in meta-positions and/or by one such group in the para-position. Hereinafter, "dialkylaniline" or "dialkylanilines" shall be used to encompass the aforementioned N-dialkylanilines.

In practice, the intermediate anilinium resins are made by reacting a substantially equimolar proportion of a dialkylaniline, halomethyl basis, with a halomethyl vinylaryl polymer, as set forth above. The reaction is carried out at a temperature between about 20° and 100° C., preferably between about 35° and 80° C., advantageously in the presence of a swelling agent which facilitates reaction between the halomethyl vinylaryl polymer and the dialkylaniline. Suitable swelling agents are those swelling agents which are known to swell resinous ar-chloromethylstyrene polymers, i.e., aromatic hydrocarbons of the benzene series, chlorinated aliphatic or aromatic hydrocarbons, alkyl ethers and chloralkyl ethers, e.g., chloroform, tetrachloroethane, ethylenedichloride, o-dichlorobenzene, 1,1,2-trichloroethane, 1,2,3-trichloropropane, cis-dichloroethylene, trichloroethylene, tetralin, pentachloroethane, methylchloroform, dioxane, perchloroethylene, carbon tetrachloride, ethylidenedichloride, chlorobenzene, toluene, ethylbenzene, benzene, chloromethyl ether, xylene, acetone and diethyl ether. An amount of swelling agent sufficient to swell the halomethyl vinylaryl polymer is used and is best determined by a simple test since it will vary somewhat, both with the polymer and with the swelling agent.

The reaction whereby the intermediate anilinium resins are formed is represented by the following equation:

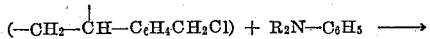

$$[-CH_2-CH-C_6H_4CH_2-N^+(R_2)C_6H_5Cl^-]$$

wherein the first parenthesis indicates a chloromethylstyrene polymer, $C_6H_5NR_2$ represents a dialkylaniline, and the bracket indicates a vinylbenzyl dialkylanilinium chloride resinous polymer.

After exchange resins, i.e., anion, cation and chelate exchange resins, are prepared from the swollen intermediate anilinium resins by reaction therewith of at least a substantially stoichiometric equivalent, original chloromethyl basis, of an ionic nucleophile of the type set forth above, dissolved in water or in a water-miscible polar hydroxylated liquid solvent, i.e., aliphatic monohydric and polyhydric alcohols having up to 10 carbon atoms, polyhydric alcohol condensation polymers such as poly-(ethylene glycol), poly(propylene glycol) and polymeric mixtures of ethylene and propylene glycol, having up to 10 carbon atoms and/or lower monoalkyl ethers of polyhydric alcohol polymers having up to 10 carbon atoms. Water-insoluble solvents such as toluene can also be used together with water or in substantially anhydrous condition to form the ionic nucleophilic reagent solutions.

The amount of ionic nucleophile in excess of that which will react with the anilinium intermediate resin is not important, since excess can be washed out from the reacted resin with a water wash and can be recovered if desired. Generally, a 20 percent to 200 percent excess of ionic nucleophile is used.

Although it is generally desirable to have the vinylbenzylic anilinium resin in a water-swollen condition for reaction with the ionic nucleophilic reagent, this is not always essential. A polar solvent or the nucleophilic reagent itself often can act as a swelling agent for the vinylbenzylic anilinium resin. Whenever the reagent can be absorbed into the anilinium resin, as by ion exchange absorption, and remain in the resin phase when the solvent is removed, it is possible to obtain reaction merely by heating the dry anilinium resin which contains the absorbed ionic nucleophilic reagent. Thus, the method of this invention makes it possible to bring the nucleophilic reagent and the reactive parts of the vinylbenzylic anilinium anion exchange resin in reactive contact.

In practice, the exchange resins of this invention are made by reacting a swollen polymeric vinylbenzylic anilinium intermediate resin, as indicated above, with a stoichiometric proportion of an ionic nucleophile to establish a covalent bond with the benzylic carbon atoms of said resin giving a dialkylaniline by-product and yielding a substituted vinylbenzylic resin which has exchanging moieties, sometimes at the atom of the reagent which establishes the covalent bond, e.g., with amine reagents, or, alternatively, to yield a substituted vinylbenzylic resin which has exchanging moieties or groups containing moieties attached at said covalent linkage which moieties can be converted to exchanging moieties by a simple hydrolysis or a simple oxidation reaction, e.g., with mercaptoalkane carboxylic acids, mercaptoalkyl nitriles and $\beta$-mercaptoalkanols.

The ionic nucleophilic reagents which can be reacted with said anilinium anion exchanging resins to give different exchanging resins are those which are ionizable and have an exchanging moiety or a moiety which can be transformed to an exchanging moiety by a simple hydrolysis or oxidation reaction, are soluble to the extent of at least 5 weight percent in water, aliphatic liquid monohydric and polyhydric alcohols having up to 10 carbon atoms, liquid polyhydric alcohol polymers such as poly(ethylene glycol), poly(propylene glycol) and polymeric mixtures of ethylene and propylene glycol having up to 10 carbon atoms and/or lower monoalkyl ethers of liquid polyhydric alcohol polymers, having up to 10 carbon atoms; which reagents react in stoichiometric proportions at 20° to 100° C. with benzyl chloride to displace at least 5 mole percent of chloride therefrom in 48 hours to form a covalent linkage with the benzylic carbon atom.

By "ionic nucleophile" is meant a nucleophilic reagent which has a measurable ionization in solution and contains an exchanging group or a precursor thereof. The above characterized ionic nucleophilic reagents used in the method of this invention encompass many diverse operable compounds and exclude inoperable compounds. The characterizing data make definite and certain to the art skilled these numerous reagents. By way of example, ionic nucleophiles include simple amines and polyamines free from hydrocarbonyl and substituted hydrocarbonyl groups, e.g., $$NH_3, NH_2OH, NH_2—NH_2,$$

$NH_2—NH—CO—NH_2$ and $(NH_2—NH)_2CO$; metal salts of $H_2SO_3$, $H_2S_2O_3$, HSCN, $H_2S$, $H_2S_n$ ($n=2$, 3 or 4) and HCN; metal salts of activated methylene or methine groups e.g., of $CH_2(COOR)_2$, $$RCOCH_2COOR, \quad CH(CH_3)(COOR)_2,$$

$RCOCH_2CN$, $ROCOCH_2CN$, $RCOCH_2COOR$, where R is an alkyl group having from 1 to 8 carbon atoms; hydrocarbonyl and substituted hydrocarbonyl amines and hydrazines, whether primary, secondary, or tertiary, e.g., methylamine,
n-amylamine,
benzylamine,
isopropylamine,
sec.-butylamine,
allylamine,
n-propylamine,
n-butylamine,
i-oamylamine,
isobutylamine,
2-aminoethanol,
1-amino-2-propanol,
histamine,
2-amino-2-methyl-1-propanol,
2-amino-2-methyl-1,3-propanediol,
2-amino-2-(hydroxymethyl)-1,3-propanediol,
2-methoxyethylamine,
n-hexylamine,
p-methoxybenzylamine,
3-isopropoxy-n-propylamine,
2-ethylhexylamine,
tert.-butylamine,
3-amino-1-propanol,
n-octylamine,
n-dodecylamine,
n-decylamine,
L-(+)histidine,
diethylamine,
dimethylamine,
dibenzylamine,
di-n-propylamine,
di-n-butylamine,
diisoamylamine,
2,2'-iminodiethanol,
diallylamine,
di-n-amylamine,
1-diethylamino-2-propanol,
1-adrenaline,
di-sec.-butylamine,
di-n-heptylamine,
di-n-hexylamine,
$\beta,\beta'$-iminodipropionitrile,
N-methyltaurine sodium salt,
N-methylcyclohexylamine,
2-ethylaminoethanol,
N-ethyl-n-butylamine,
iminodiacetic acid disodium salt monohydrate,
iminodiacetonitrile,
diethyl iminodiacetate,
N-methyl-n-butylamine,
trimethylamine,
triethylamine,
2-dimethylaminoethanol,
2-diethylaminoethanol,
3-diethylamino-1-propanol,
2,2',2''-nitrilo-triethanol,
triisoamylamine,
tri-n-amylamine,
2-di-n-butylaminoethanol,
3-di-n-butylamino-1-prpoanol,
diethylaminoacetonitrile,
1-dimethylamino-2-propanol,
$\beta$-dimethylaminopropionitrile,
triallylamine,
1-di-n-butylamino-1-propanol,
hexamethylenetetramine,
ethylenediamine,
1,2-propanediamine,
triethylenetetramine,
diethylenetriamine,
N,N-diethylethylenediamine,
tetraethylenepentamine,
1,6-hexanediamine,
N,N-dimethyl-1,3-propanediamine,
3,3'-diaminodipropylamine,
1,8-p-menthanediamine,
p-aminobenzoic acid metal salts,
aniline,
o-anisidine,
p-anisidine, 1-naphthylamine,
4-amino-1-naphthalenesulfonic acid sodium salt,
sulfanilic acid sodium salt,
3-amino-p-toluenesulfonic acid metal salts,
1-amino-2-naphthol-4-sulfonic acid metal salts,
o-aminophenol,
p-aminophenol,
5-amino-2-naphthalenesulfonic acid metal salts,
2-amino-1-naphthalenesulfonic acid metal salts,
p-bromoaniline,
8-amino-1-naphthalenesulfonic acid metal salts,
p-chloroaniline,
o-chloroaniline,
2,4-dimethylaniline,
m-toluidine,
m-aminophenol,
m-chloroaniline,
p-arsanilic acid metal salts,
p-aminophenylacetic acid metal salts,
o-aminobenzene-sulfonic acid metal salts,
2-aminopyridine,
2-amino-3-methylpyridine,
2-amino-4-methylpyridine,
2-amino-5-methylpyridine,
2-amino-6-methylpyridine,
phenylhydrazine,
methyl hydrazine,
sym-dimethyl hydrazine,
unsym-dimethyl hydrazine,
p-phenylenediamine,
p-p'methylenedianiline,
3,5-dimethylaniline,
2-phenylethylamine,
8-amino-1-naphthol-5-sulfonic acid metal salts,
6-amino-1-naphthol-8-sulfonic acid metal salts,
m-aminoacetophenone,
o-aminobenzenethiol,
4,4'-oxydianiline,
6-amino-m-toluenesulfonic acid metal salts,
p-aminobenzonitrile,
2,5-dimethoxy-aniline,
2-amino-4-phenylphenol and o-arsanilic acid metal salts.

Other ionic nucleophilic reagents include amino acids and their soluble metal salts, e.g., those of N-phenylglycine,
glycine,
DL-2-aminohexanoic acid,
L-(—)cystine,
DL-α-alanine,
α-aminoisobutyric acid,
DL-α-amino-n-valeric acid,
DL-β-phenylalanine,
DL-α-aminophenyllacetic acid.
DL-2-aminooctanoic acid,
DL-aspartic acid,
diisoleucine,
L-(+)glutamic acid,
p-aminophenylacetic acid,
DL-valine,
DL-α-amino-n-butyric acid,
DL-leucine,
L-(—)leucine,
DL-methionine,
4-aminobutyric acid,
DL-ser and β-alanine.

Still other such reagents include metal salts of hydroxyl-containing compounds, e.g., the alcoholic and phenolic compounds such as 4-hydroxybenzoic acid and its metal salts, 4-hydroxy, 4'-carboxybiphenyl and its metal salts, $CH_2OH(CHOH)_4CH_2OH$, $CH_2OH(CHOH)_3CH_2OH$, 1,3-dihydroxybenzene, 1,4-dihydroxybenzene, o-hydroxybenzaldehyde, 4-hydroxybenzonitrile; metal salts of mercaptan compounds, whether alkyl or aryl, e.g., o-carboxyphenyl mercaptan, o-carboxycyclohexyl mercaptan, $HSCH_2CO_2H$, $HSCH_2CH_2CO_2H$, $HSCH_2CH_2SO_3H$,
$HSCH_2PO_3H_2$, $HSCH_2CH_2OH$, $HSCH_2CH_2CN$,
$HSCH(CO_2H)CH_2CO_2H$;

seleno- and telluro-acids, e.g., $HSeCH_2CO_2H$, sulfinic acids $RSO_2H$, where R is a 1 to 8 carbon alkyl group or an aryl group, e.g., $C_6H_4(CO_2H)SO_2H$, which also contains another exchanging moiety or precursor thereof.

Further reagents include hydrocarbonyl amines having a substituent of the group of $—PO_2H$, $—AsO_3^=$, $—SO_2^-$, $—COSR$, $—CS_2R$, $—CN$, $—CO_2^-$, $—PSO_2^=$, $—PO_3^=$, $—SO_3^-$, $—O^-$, $—N^=$, $—BO_2H$, $—SeO_3^-$.

Of the many ionic nucleophilic reagents characterized above which are operable in this invention, it would be expected, as was indeed found, that the smaller molecules more readily penetrate and react more rapidly both with the lower and higher crosslinked vinylbenzylic anilinium anion exchange resins than do the larger molecules of reagent. To determine the desirability and reaction characteristics of a given anilinium anion exchange resin with a given higher molecular weight nucleophilic reagent, a simple trial reaction followed by a capacity test is all that is needed. Alternatively, the absorption characteristics of an anilinium anion exchange resin for a given nucleophilic reagent can be tested by immersing a resin sample of the desired crosslinkage in a large amount of solution of the desired reagent, withdrawing the resin particles, draining the resin particles free of excess reagent, washing the reagent-wet resin with a solvent for the nucleophile and determining the amount of reagent present in the wash solution. The amount of reagent absorbed by the resin is compared with the amount of reagent retained on the surface of glass beads or other impermeable particles having the same particle size as that of the resin particles. Such a comparison gives a value of relative permeability of a given reagent for anilinium resins of varying crosslinkages.

The reaction between a vinylbenzylic anilinium anion exchange resin and an ionic nucleophilic reagent is advantageously carried out at a reaction temperature between 40° and up to the boiling point of the reaction medium, up to ca. 200° C. if a pressure vessel is used, for a reaction time of about one-half hour up to several days. If the lower temperatures are employed, the longer reaction times are generally desirable. Generally, the nucleophilic reagent is present in excess up to about 200 percent of theory. The excess can be recovered, hence the amount of excess is not important. Alternatively, the exchange resin can be formed in situ from halomethyl vinylaryl polymers and dialkyl-anilines, as indicated, and therein reacted with the indicated nucleophilic reagents. Thus, such a one-step method can be used instead of the two-step method wherein anilinium resin intermediate is first formed and then reacted with a nucleophilic reagent, as indicated.

Typical reactions of the anilinium intermediate resin with an ionic nucleophile can be summarized by the following equation:

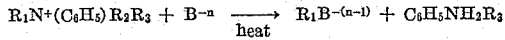

wherein $R_1$=a vinylbenzylic resin matrix, $B^{-n}=SO_3^=$,

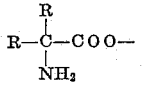

or other nucleophilic moiety wherein n is an integer and $C_6H_5NR_2R_3$=a dialkylaniline, all as previously described in detail.

Examples which follow describe completely representative specific embodiments of the invention. They are not intended to limit the invention other than as defined in the claims.

Example 1
PREPARATION OF DIMETHYLANILINIUM RESIN AND CATION EXCHANGE RESIN THEREFROM A quantity of 50 g. of 50–100 U.S. mesh size dry chloromethylstyrene polymer beads crosslinked with one weight percent of divinylbenzene was swollen with 200 ml. of methylenechloride. Then 100 g. of dimethylaniline and 200 ml. of water were added and the mixture was stirred and heated at reflux. After 1½ hours, another 100 ml. of methanol was added and heating was continued for another 3½ hours. Final volume of the resulting dimethylanilinium resin after washing with methanol, then water, was 750 ml., while (Cl$^-$) was 0.37 meq./ml., 94 percent of theory.

To 200 ml. (74 meq.) of anilinium resin was added 400 ml. of water plus 200 g. of $Na_2SO_3$. The mixture was heated at reflux for 17.5 hours. A 4.0 ml. sample was then removed, rinsed with N/1 HCl, then water. Titration disclosed the resulting resin had a (H$^+$) capacity of 0.30 meq./ml. After another 3 hours of heating, the reaction mixture was filtered and the product resin was washed well with 4 N $H_2SO_4$, then with water. Its volume (wet settled) was 142 ml. Thus, a total of 74 ml. of strongly acidic cation exchange resin was produced having an meq./ml. of 0.30, which is 60 percent of the theoretical for the reaction:

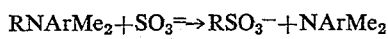

$$RNArMe_2 + SO_3^= \rightarrow RSO_3^- + NArMe_2$$

wherein R represents a polymeric vinylbenzylic moiety and $ArNMe_2$ represents dimethylaniline.

Example 2
REACTION OF ANILINIUM RESIN WITH Na₂ IMINODIACETATE (IDA)

A quanity of 100 ml. of the anilinium resin of Example 1, 50 ml. of a 25 percent aqueous solution of disodium IDA and 50 ml. of water was heated at reflux for 21 hours. A 3.0 ml. resin sample was then removed from the reaction mixture. It had a water content, after water washing, of 73.7 percent and a capacity for Cu$^{++}$ of 32 millimoles per 100 ml. (0.32 mmoles/ml.). After heating the reaction mixture for another 72 hours, the resulting resin was washed with water, methanol and water. Its volume (wet settled in water) was 60 ml., and its Cu$^{++}$ capacity was 0.35 meq./ml. This corresponds to a 63 percent conversion to the IDA resin, based on total resin product and the original capacity of the anilinium resin.

Example 3
REACTION OF ANILINIUM RESIN WITH Na₂ IDA IN METHANOL-WATER MIXTURE Polymeric vinylbenzyl dimethylanilinium chloride resin (208 ml. or 98 meq.), 150 ml. of Na₂ IDA (25 percent aqueous solution, ca. 200 meq.) and methanol (300 ml.) were heated at reflux, 70° C., for a total of 21 hours. Product resin was washed with methanol and water. Its wet settled volume in water was 158 ml., and its Cu$^{++}$ capacity was 0.39 meq./ml.

Example 4
REACTION OF ANILINIUM RESIN WITH Na₂ SALT OF THIOGLYCOLIC ACID

Dimethylanilinium resin (200 ml. or 94 meq.), thioglycolic acid (18.5 g. or 200 mmoles), caustic pellets (16.0 g. or 400 meq.) and 100 ml. of water were heated together in a flask on the steam bath for 64 hours. Product resin, polymeric vinylbenzyl thioglycolic acid disodium salt, was washed with methanol and water. Its volume in water was 175 ml., and its Cu$^{++}$ capacity was 0.182 mmoles/ml.

Example 5
REACTION OF ANILINIUM RESIN WITH DIETHYLENETRIAMINE

Dimethylanilinum resin (206 ml. or 97 meq.), diethylenetriamine (25 ml. or ca. 250 mmoles) and water (ca. 200 ml.) were heated together in a flask on the steam bath for 64 hours. Product resin, having diethylenetriamine substituent groups at benzylic carbon atoms, was washed with methanol, ammonia water and water. Volume of product in water was 48 ml. Capacity for Cu$^{++}$, obtained by rinsing the resin with dilute copper sulfate solution, then water and stripping off the copper ions with acid and analyzing for copper, was 0.57 mmoles/ml.

Example 6
REACTION OF ANILINIUM RESIN WITH Na₂ SALT OF MERCAPTOSUCCINIC ACID Dimethylanilinum resin (214 ml. or 100 meq.), mercaptosuccinic acid (30 g. or 200 mmoles), NaOH pellets (24 g. or 600 meq.) and water (ca. 150 ml.) were heated together in a flask on the steam bath for 22 hours. Product beads, polymeric vinylbenzyl mercaptosuccinic acid disodium salt, were washed with methanol and water. Their wet settled volume in water was 222 ml. and their Cu$^{++}$ capacity was 0.30 mmoles/ml.

Example 7
REACTION OF ANILINIUM RESIN WITH TRIETHYLENETETRAMINE

Dimethylanilinum resin (225 ml. or 105 meq.), triethylenetetramine (30 ml. or about 200 mmoles) and water (ca. 150 ml.) were heated together in a flask on the steam bath for 22 hours. Product beads were washed with methanol and water. Their volume in water was 60 ml., and their Cu$^{++}$ capacity was 0.45 meq./ml.

Example 8
REACTION OF ANILINIUM RESIN WITH SODIUM SALT OF GLYCINE

Dimethylanilinium resin (230 ml. or 108 meq.), glycine (15 g. or 200 meq.), NaOH pellets 8 g. or 200 meq.) and water (ca. 150 ml.) were heated in a flask on the steam bath for 22 hours. Product beads, polymeric vinylbenzylglycine sodium salt, when washed with methanol and water, had a wet settled volume of 58 ml. and a Cu$^{++}$ capacity of 0.20 meq./ml.

Example 9
PREPARATION OF 12 PERCENT CROSSLINKED DIMETHYLANILINIUM RESIN

Chloromethylated 12 percent divinylbenzene-crosslinked polystyrene beads (5.0 g. or 16 meq., chloro basis), methylene chloride (10 ml.), methanol (10 ml.), dimethylaniline (10 ml. or 78 meq.) and water (ca. 20 ml.) were shaken together at room temperature or slightly above for 3 days. The resulting beads were washed with methanol, then with water. They had a wet settled volume in water of 13.7 ml. and a Cl$^-$ content, ionic Cl, of 1.04 meq./ml. This corresponds to a conversion of 89 percent of theory.

Example 10
REACTION OF THE RESIN OF EXAMPLE 9 WITH SODIUM SULFITE

The dimethylanilinium resin of Example 9 (4.9 ml. or 5.1 meq.), sodium sulfite (6.0 g. or 48 meq.) and water (ca. 50 ml.) were heated together in a flask on the steam bath for 24 hours. Product resin was filtered, washed with methanol, water, N/1 HCl, and considerable water. Titration of the product beads (3.9 ml.) with NaOH in the presence of NaCl indicated the resin had a strong acid cation exchange capacity of 0.043 meq./ml.

Example 11
REACTION OF DIMETHYLANILINIUM RESIN WITH Na₂ MERCAPTOACETATE

A mixture of 18 ml. or 23 meq. of ca. 8 percent crosslinked dimethylanilinium resin beads, 5 g. or 54 meq. of mercaptoacetic acid, 3 g. NaOH pellets and ca. 100 ml. of water was heated on the steam bath under a nitrogen stream. After 24 hours, the mixture was dry. After swelling in water and rinsing with methanol and water, the volume of the product beads was 14.5 ml. Copper capacity was determined by rinsing 6.4 ml. of resin product with 200 ml. N/10 copper sulfate solution, then with water then with 200 ml. of N/1 sulfuric acid, collecting the eluate from the sulfuric acid rinse only and analyzing it for copper content. The sulfuric acid contained copper equivalent to 0.43 meq./ml. of resin. However, the resin still had a greenish color, indicating that some copper still was on it and was very difficult to elute. The conversion to the mercaptoacetate form was at least 27 percent of theory, based on the found copper capacity.

*Example 12*

PREPARATION OF RING MONOMETHYL N-DIMETHYLANILINIUM RESINS

To three seperate batches of one percent crosslinked chloromethylated polystyrene beads, 50–100 mesh, 4.67 meq./g., was added a chemically equivalent amount of one of the three isomeric ar-methyl dimethylanilines plus water, i.e., 5.0 g. resin, 3.19 g. aniline, 75 ml. water. The separate, bottled mixtures were shaken at room temperature. After 17 hours, the meta-isomer had reacted to 91 percent of the theoretical amount, and its washed product resin (50 ml.) had a Cl⁻ capacity of 0.423 meq./ml. The para-isomer had reacted 92 percent, and its resin had a washed volume of 50 ml. and a capacity of 0.43 meq./ml. The ortho-isomer had reacted to little or no degree, since little volume increase of the beads was noted. After another 120 hours, the ortho reaction mixture was washed with methanol and water, and the chloride capacity of the beads was determined. Reaction had only been 6 percent of the theoretical at that time, apparently, since the capacity was only 6 percent of the theoretical. Its final volume was 9.0 ml.

*Example 13*

PREPARATION OF OTHER ANILINIUM RESINS

To separate 4.0 g. batches of the chloromethylated beads, as in Example 12 (18.6 meq.), was added 20 ml. methylene chloride, 20 ml. methanol and 40 ml. of water, and a chemically equivalent amount of one of N,N-di-n-propylaniline (3.35 g.), p-bromo-N,N-dimethylaniline (3.78 g.) or p-nitro-N,N-dimethylaniline (3.14 g.). The bottled, separate reaction mixtures were shaken at room temperature. After 137 hours, only the mixture containing p-bromo compound had reacted extensively. It gave a washed resin, 33 ml., 0.45 meq./ml. capacity, corresponding to 80 percent of theoretical reaction. The dipropyl product, washed, had a volume of 10 ml., a capacity of 0.10 meq./ml. (5 percent of theory) and the p-nitro product had volume of 6 ml. and a capacity of 0.12 meq./ml. (4 percent of theory).

*Example 14*

ONE-STEP PREPARATION OF IDA RESIN

In a one-liter Erlenmeyer flask provided with a condenser was heated together on a steam bath for 16 hours with stirring 22 g. chloromethylpolystyrene beads, 4.29 meq. Cl⁻/g., 43 g., 288 meq., diethylaniline, 80 ml. methylene chloride, 70 ml. methanol and 191 ml., 270 meq., aqueous 25 percent iminodiacetic acid disodium salt. Product resin was filtered and washed with methanol and water. Product wet settled volume was 36 ml. An 8.2 ml. wet settled volume of resin was rinsed with ca. 200 ml. N/10 copper sulfate then with excess water. The resin was then eluted with ca. 200 ml. N/1 sulfuric acid. An amount of 0.162 meq. Cu⁺⁺ was eluted from the resin, per milliliter of resin.

What is claimed is:

1. A method for making an exchange resin by reacting (1) a vinylbenzylic anilinium anion exchange resin prepared by reacting at a temperature between 20° and 100° C. in substantially stoichiometric proportions (a) a 0.2–12 mole percent crosslinked ar-halomethylvinylaryl resinous polymer wherein the crosslinking agent is a conventional crosslinking agent having two alkenyl groups per mole and the ar-halomethyl groups average between 0.25 and 1.5 per aromatic nucleus with (b) an N-dialkyl-, an N-di(hydroxyalkyl)- or an N-alkyl-N-hydroxyalkyl-aniline wherein the alkyl and hydroxy alkyl groups contain a total of up to six carbon atoms and wherein one alkyl or hydroxyalkyl group contains not more than two carbon atoms and wherein the aryl nucleus is substituted by up to two 1–4 carbon alkyl groups and/or by up to two halo groups in meta positions and/or by one such group in the para position with respect to the N-position, which anilinium anion exchange resin has reactive

[—CH$_2$—CH—C$_6$H$_4$CH$_2$—N⁺(R$_2$)C$_6$H$_5$Cl⁻]

moieties wherein R is alkyl or hydroxyalkyl, as described above, with (2) an ionizable nucleophilic reagent which is soluble to the extent of at least 5 percent by weight in water or an aliphatic liquid alcohol having 1 to 10 carbon atoms per mole, said reagent having a property of reacting in stoichiometric quantities with benzyl chloride at 20° to 100° C. to displace at least 5 mole percent of chloride therefrom in 48 hours, which reagent comprises a group which establishes a covalent bond with the benzyl carbon atom of said resin and displaces an N-dialkyl-, an N-di(hydroxyalkyl) or an N-alkyl-N-hydroxyalkyl-aniline by-product with substitution of a substituent group which has exchanging moieties or which can be converted to have exchanging moieties by a simple hydrolysis or oxidation reaction.

2. The method of claim 1 wherein the nucleophilic reagent is sodium sulfite.

3. The method of claim 1 wherein the nucleophilic reagent is disodium iminodiacetate.

4. The method of claim 1 wherein the nucleophilic reagent is disodium thioglycollate.

5. The method of claim 1 wherein the nucleophilic reagent is diethylenetriamine.

6. The method of claim 1 wherein the nucleophilic reagent is trisodium mercaptosuccinate.

7. The method of claim 1 wherein the nucleophilic reagent is sodium glycinate.

8. The method of claim 1 wherein the nucleophilic reagent is disodium mercaptoacetate.

9. A method for making an anion exchanging resin by reacting at a temperature between 20° and 100° C. substantially stoichiometric proportions of (1) a resinous polymeric chloromethylstyrene crosslinked with up to 12 mole percent of a crosslinking agent having two alkenyl groups per mole and swollen with a swelling agent, with (2) a dialkylaniline to form polymeric vinylbenzyl dialkylanilinium chloride, said dialkylaniline being selected from the group consisting of N-dialkylaniline, meta-substituted N-dialkylaniline, para-substituted N-dialkylaniline and meta,para-substituted N-dialkylaniline, nuclear substituents of which are 1 to 4 carbon alkyl groups and halo groups, the N-dialkyl substituents totalling up to 6 carbon atoms and one alkyl group of which has up to 2 carbon atoms.

References Cited by the Examiner

UNITED STATES PATENTS 2,580,325  12/1951  Scott et al. _____ 260—2.2

FOREIGN PATENTS 767,821  2/1957  Great Britain.

WILLIAM H. SHORT, *Primary Examiner.*

C. A. WENDEL, *Assistant Examiner.*